United States Patent Office 2,920,940
Patented Jan. 12, 1960

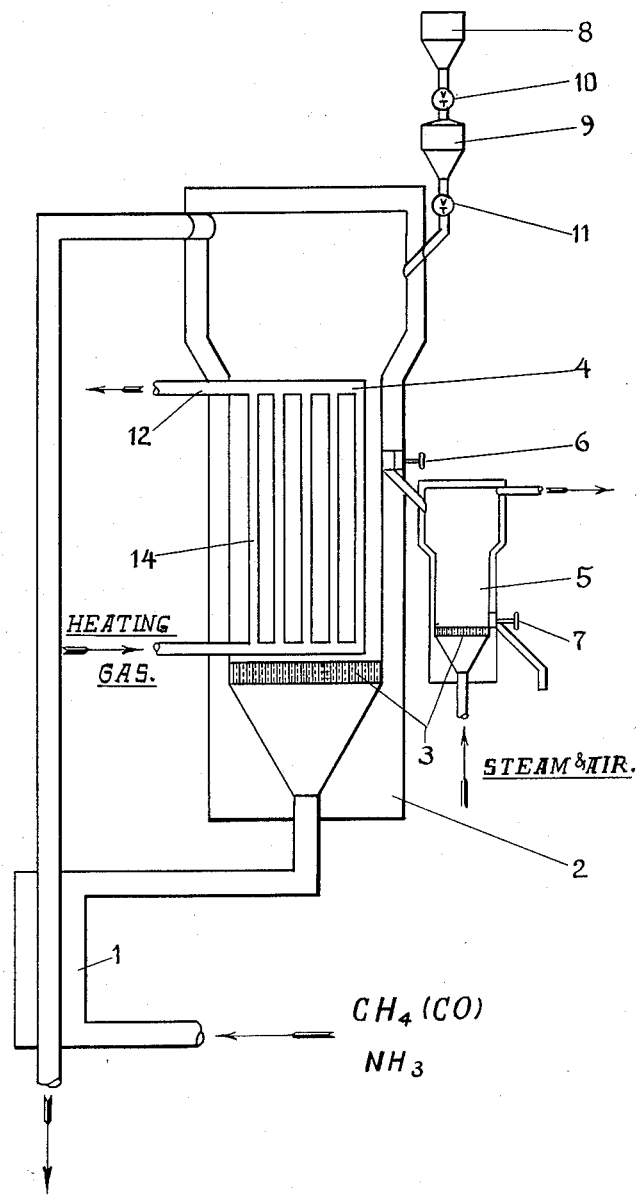

2,920,940

MANUFACTURE OF HYDROCYANIC ACID

Hermann Kronacher and Walter Dichtl, Trostberg, Germany, assignors to Süddeutsche Kalkstickstoff-Werke A.G., Trostberg, Germany Application July 12, 1955, Serial No. 521,521

Claims priority, application Germany July 13, 1954

4 Claims. (Cl. 23—151)

The invention relates to the catalytic preparation of hydrocyanic acid.

Hydrocyanic acid is prepared by reacting carbon monoxide or methane with ammonia in the presence of a suitable catalyst, for instance alumina or platinum. For its use in reactors, the alumina has been employed in granular form. In the preparation of such granular material, a considerable proportion of the catalyst is obtained as dust, which cannot be employed as such. In addition, the granular material disintegrates during use, and eventually the catalyst layer becomes clogged, which stops the further reaction. Even when platinum catalysts are used in form of layers or nets, clogging cannot be avoided. In either case, the reactor has to be put off stream, and the catalyst must be removed and replaced.

The application of the well known fluidized bed principle is difficult for the hydrocyanic acid manufacture because the reaction is endothermic. Therefore, the heat carried off by the fluidized catalyst bed would have to be continuously replaced.

It is a principal object of the invention to provide a method for the catalytic preparation of hydrocyanic acid, which can be carried out without interruptions and stoppages.

Another object of the invention is to provide a suitable reactor for carrying out the reaction.

Other objects and advantages will be apparent from a consideration of the specification and claims.

According to our invention, a powdery catalyst layer is placed in a reactor in such a way that the gas stream imparts to the layer turbulent motion, and maintains it in turbulence in a zone extending to a level below the opening of the tube or channel through which the reaction gases are withdrawn. In this manner, the catalyst may remain in the reaction zone until it starts becoming inactive due to certain deposits resulting from the reaction itself, particularly carbon. Whenever it becomes inactive, it is reactivated by gases which remove the carbon.

For reactivation, portions of the catalyst are laterally withdrawn from the reaction zone and treated with activating gases, whereby advantage is taken of the heat carried by said catalyst. The activation of the catalyst is carried out in a zone adjoining the reactor by means of superheated steam, which reacts with the carbon deposits of the catalyst to form carbon dioxide, carbon monoxide, and hydrogen. Also, the reactivating zone is maintained as a turbulent zone, in which the catalyst is kept floating in the gas mixture containing superheated steam. By the reactivation, the catalyst resumes its highly active state so that the periodic withdrawal of the catalyst from the reaction zone and return into the reaction zone makes it possible to use the same catalyst continually with uniform yields.

The invention will be described in more detail with reference to the accompanying drawing, which illustrates diagrammatically suitable apparatus for carrying out our invention.

In the drawing, the reference numeral 2 designates a turbulent reactor, into which the reaction gases are introduced through the heat exchanger 1 in heat exchange with the outgoing gases. The reactor is filled with a granular catalyst, supported on a ceramic filter plate 3 through which the gases enter the reactor under a pressure sufficient to maintain the catalyst in turbulent motion but below the exit 12. The reactor contains a system of refractory heating tubes 14 which are maintained at reaction temperature by a heating gas.

The hopper 8 contains a supply of the catalyst, which is sluiced through the valves 10 and 11 and the container 9 into the reactor.

If the conversion rate of the gases in the reactor decreases, a portion of the catalyst is withdrawn into the regenerator 5 by opening the valve 6, and subsequently a corresponding amount of fresh or reactivated catalyst is supplied from the hopper 8 through the sluice 9. In the regenerator 5, the catalyst is supported on a refractory filter plate 13, and a mixture of superheated steam and air is passed through said filter plate to maintain the catalyst in turbulence until it is substantially free of carbon deposits; the regenerated catalyst is then returned to the reactor.

The use of a finely divided catalyst, which is kept by the gases entering the reaction zone in a floating, revolving state, presents the advantage that the reacting gases are at all times in contact with a catalyst of uniform temperature. In this way, the reaction proceeds much quicker and more uniform than in reactors where the catalyst has to be heated up by the reacting gases.

The floating powdery catalyst makes the process independent of the cross section and height of the reactor. The reactor, which will be preferably a tubular reactor, can be uniformly heated over its whole length by providing suitable heating tubes or channels; the reactor space can be evenly divided by the heating channels, which, in combination with the turbulent catalyst layer, provides for an intensive uniform heat transfer, so that even in reactors of large cross section uniform temperatures are maintained throughout the reaction zone. As our method operates without stationary catalyst layers, there is no possibility for deposits in such layers, and consequently, no obstructions can be formed in the contact zone resisting the gas passage. Therefore, the gas pressure required for the process is much lower than for the conventional methods using stationary contacts.

As catalyst, we use alumina prepared by decomposing aluminum nitrate by rapid heating to a temperature above 500° up to 700° C. in a current of nitrogen according to our copending application, Serial No. 521,643 filed concurrently with the instant application. Said catalyst which contains at least 90% of alumina, the balance being minor amounts of the oxides of heavier metals such as cerium, thorium, zinc, is preferably used in the form of granules of about 3 to 10 mm. and has a very low specific gravity of 0.16 to 0.19, which makes it particularly suitable for the floating catalyst process of our invention.

The following example illustrates a preferred method of carrying out the method of the present invention, it being understood that the invention is not limited to the details set forth in the example.

Example

A reactor of the type illustrated in the drawing was filled with 10 l. of an alumina catalyst, prepared by decomposition of molten aluminum nitrate at 500 to 600° C. according to the method described in our copending application, Serial No. 521,643, filed concurrently herewith. The catalyst had a grain size of about 3 to 10 mm. and a density of .186. 20 m.$^3$ per hour of a gas mixture consisting of 1 part by volume of $NH_3$ and 5 parts by volume of CO was passed through the catalyst at 650°

C. and kept the catalyst in turbulent motion suspended in the gas. The gas leaving the reactor had a content of 6.25 percent HCN by volume; the yield was 76 g. of HCN per 1 m.³ of the gas mixture.

Whenever the yield decreased, about 5 percent of the catalyst was withdrawn, without interrupting the operation, from the reactor into the regenerator. In the regenerator, the still hot catalyst was kept in turbulent motion by a mixture of air and superheated steam (about 70% air and 30% steam) at a temperature of about 900° to about 1100° C. and then returned over the hopper 8 and sluicing device 10, 9, 11, into the reactor.

The above recited yield could be substantially maintained for several months if a single regeneration of about 5 percent of the catalyst was carried out daily, which regeneration or reactivation was performed concurrently with, and without interruption of, the normal operation of the reactor.

We claim:

1. In a method of producing hydrocyanic acid by catalytic reaction of ammonia with carbon monoxide the steps of passing the reacting gases in a reactor upwardly through a reaction zone containing finely divided catalyst, maintaining a rate of flow sufficient to keep said catalyst floating in turbulent motion confined within said reaction zone, heating the reaction zone at reaction temperature by means of heating elements, continuing the upward flow of the gases in the reactor beyond the floating catalyst containing reaction zone into a zone free of catalyst, and withdrawing the gases, said catalyst containing at least 90 percent of alumina, the balance being oxides of a metal of the group consisting of cerium, thorium, zinc, and mixtures thereof, and having a grain size of about 3 to 10 mm. and a density of .16 to .19.

2. In a method as defined in claim 1 the step of intermittently withdrawing catalyst laterally from the reaction zone while continuing the passage of the reacting gases therethrough, treating said catalyst with a gas removing carbon deposits, and returning said reactivated catalyst into the reaction zone.

3. In a method as defined in claim 1 the steps of intermittently withdrawing a minor portion of the catalyst laterally from the reaction zone into a reactivating zone, passing a gas mixture of superheated steam and air upwardly through said reactivating zone, said gas mixture maintaining said catalyst while still hot suspended and in turbulent motion, continuing said reactivating treatment until carbon deposited on the catalyst has been substantially removed, and returning said reactivated catalyst into the reaction zone.

4. The method as claimed in claim 1 wherein the gases entering the reactor are conducted in heat exchange contact with the gases leaving the reactor.

References Cited in the file of this patent

UNITED STATES PATENTS

| | | |
|---|---|---|
| 1,582,851 | Mittasch | Apr. 27, 1926 |
| 1,598,707 | Bredig | Sept. 7, 1926 |
| 1,934,838 | Andrussow | Nov. 14, 1933 |
| 2,596,507 | Perry | May 13, 1952 |
| 2,658,822 | Hengstebeck | Nov. 10, 1953 |
| 2,727,810 | Leffer | Dec. 20, 1955 |
| 2,773,015 | Yoder | Dec. 4, 1956 |